United States Patent [19]

Gilhaus

[11] Patent Number: 4,754,527
[45] Date of Patent: Jul. 5, 1988

[54] APPARATUS FOR ENTWINING FIBER STRANDS

[75] Inventor: Konrad F. Gilhaus, Bielefeld, Fed. Rep. of Germany

[73] Assignee: Spinnereimaschinenfabrik Seydel & Co. GmbH, Bielefeld, Fed. Rep. of Germany

[21] Appl. No.: 49,664

[22] Filed: May 13, 1987

[30] Foreign Application Priority Data

May 14, 1986 [DE] Fed. Rep. of Germany ....... 3616196

[51] Int. Cl.[4] .................... D01G 37/00; D01G 23/00
[52] U.S. Cl. ...................................... 19/157; 28/104; 28/274; 28/276
[58] Field of Search .................. 19/150, 157, 288; 28/104, 268, 274, 276; 57/350

[56] References Cited

U.S. PATENT DOCUMENTS

| 984,195 | 2/1911 | Cooper | 19/150 |
|---|---|---|---|
| 3,069,836 | 12/1962 | Dahlstrom et al. | 28/276 |
| 3,277,537 | 10/1966 | Roeder et al. | 19/150 X |
| 3,325,872 | 6/1967 | Ethridge et al. | 28/276 |
| 3,364,537 | 1/1968 | Bunting, Jr. et al. | 28/276 X |
| 3,525,133 | 8/1970 | Psaras | 28/276 |
| 3,581,486 | 6/1971 | Dibble | 28/276 X |
| 3,958,310 | 5/1976 | Blanc et al. | 28/276 |
| 4,005,566 | 2/1977 | Hawkins | 57/350 |

FOREIGN PATENT DOCUMENTS

| 73267 | 5/1970 | German Democratic Rep. ... | 19/150 |
|---|---|---|---|
| 21747 | of 1914 | United Kingdom ................ | 19/150 |
| 2132240 | 7/1984 | United Kingdom ................ | 19/288 |

Primary Examiner—Robert R. Mackey
Attorney, Agent, or Firm—Becker & Becker, Inc.

[57] ABSTRACT

An apparatus for entwining the fibers of slivers of stretch break-conversion machines, cut-conversion machines, carding operations, drawing operations, etc., with the slivers including individual fibers that are initially disposed essentially parallel to one another. To improve the cohesion of the fiber slivers, and to make it possible to transport and further process the slivers without difficulty, and without limiting the range of application of the previously advantageous conventional processes, it is proposed to convert the fiber sliver into a sliver having an essentially flat shape, to deflect a portion of the fibers of the sliver from their parallel orientation, and to further deflect the already deflected fibers in the direction that is essentially perpendicular to these fibers, with this further deflecting step effecting entwining of the deflected fibers with those fibers that are still disposed in the parallel orientation.

11 Claims, 4 Drawing Sheets

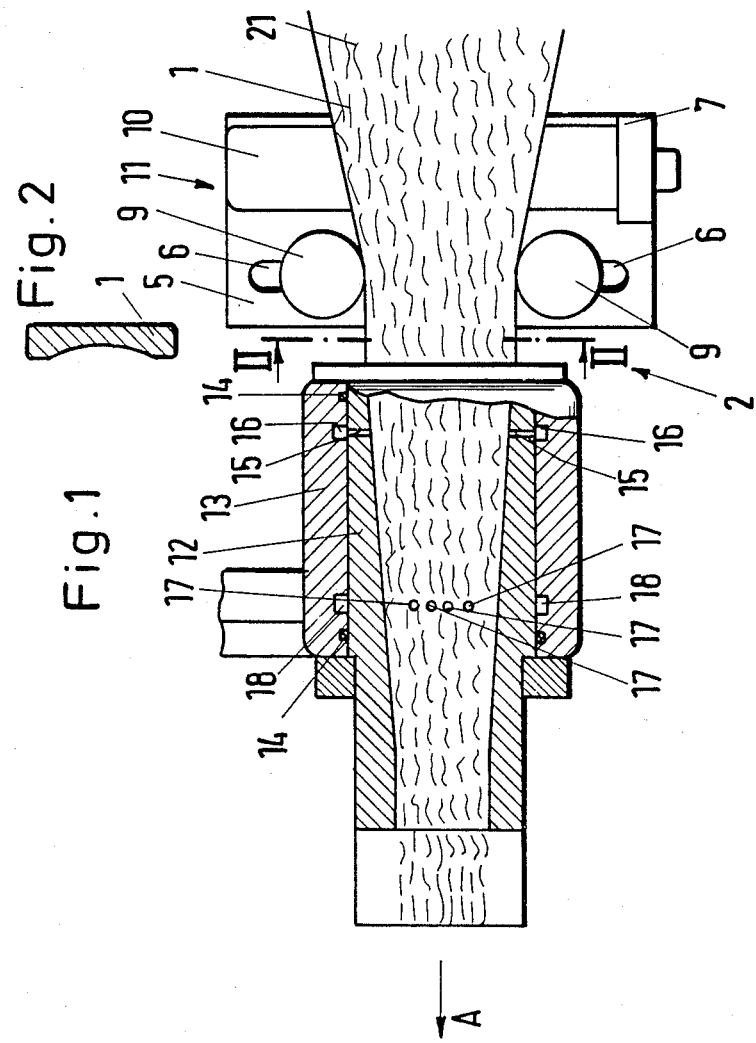

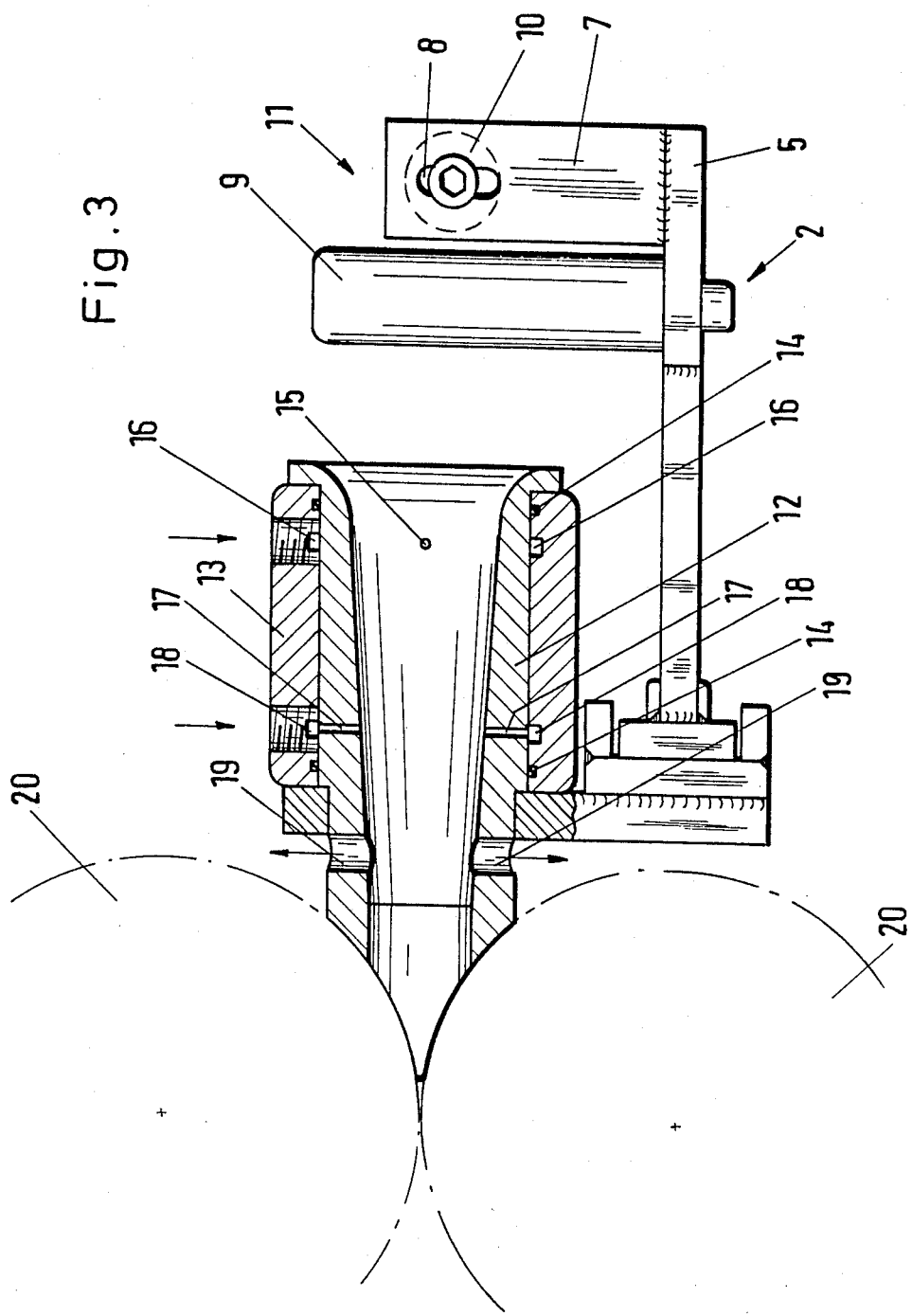

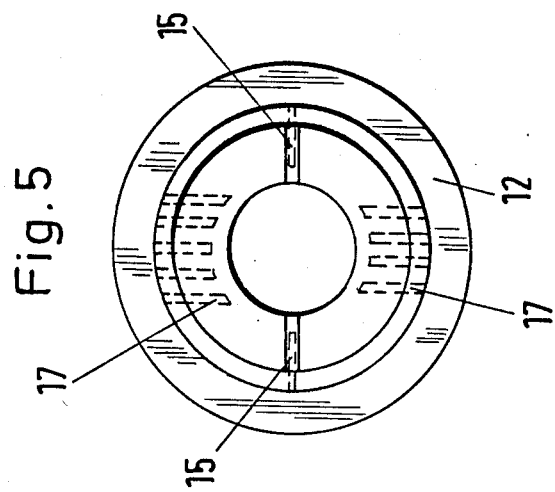
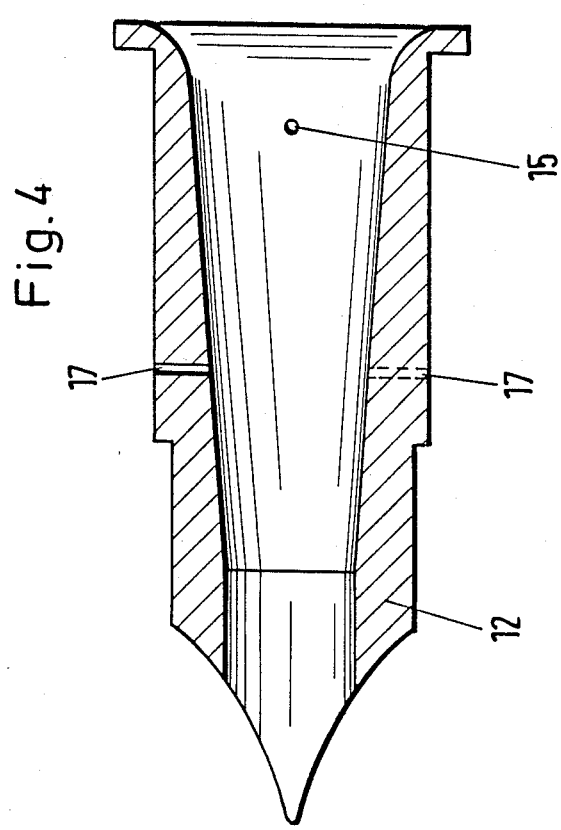

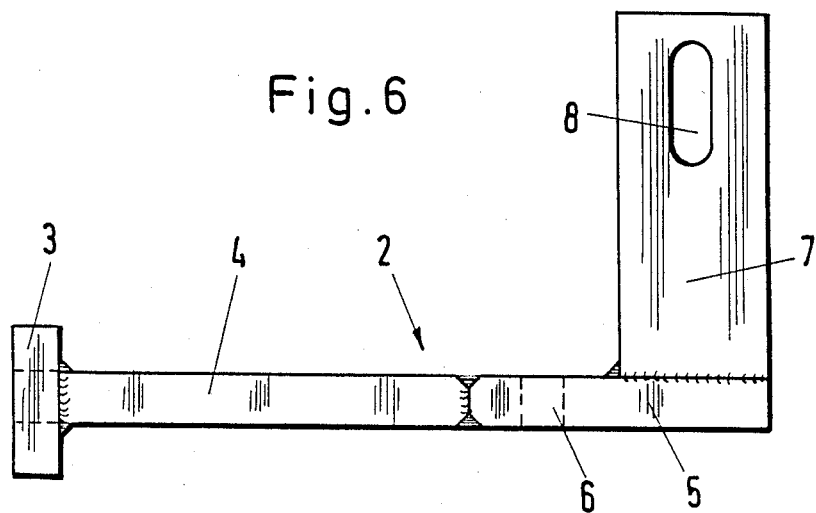
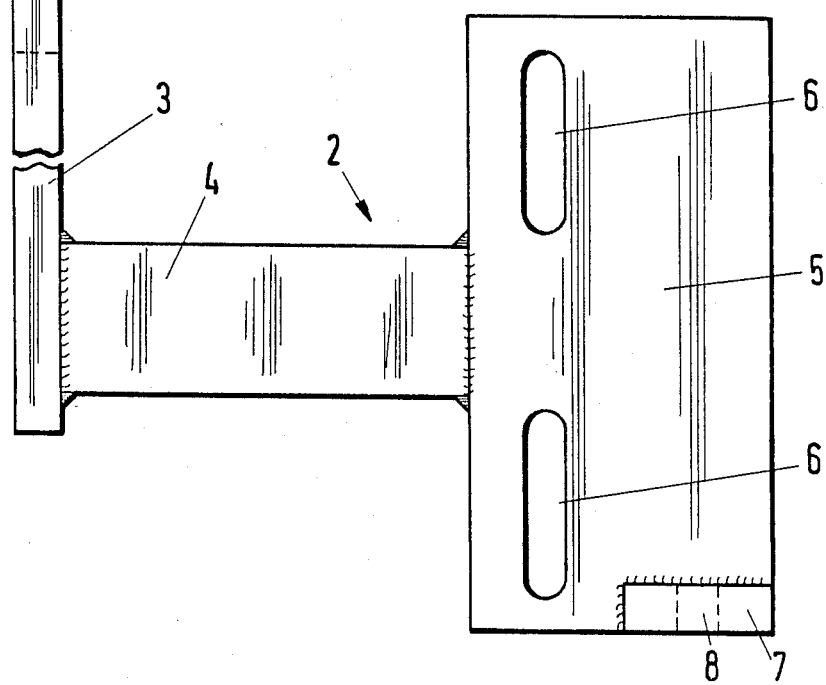

APPARATUS FOR ENTWINING FIBER STRANDS

BACKGROUND OF THE INVENTION

1. Field of the Invention

The present invention relates to an apparatus for interweaving or entwining the fibers of slivers or fiber strands of stretch breakconversion machines, cut-conversion machines, carding operations, drawing operations, etc., with the fiber slivers comprising individual fibers that are initially disposed essentially parallel to one another.

2. Description of the Prior Art

Man-made fibers are produced as endless filaments or tows having a high degree of evenness. For further processing in the secondary spinning stage, and in conformity with their intended application, the filaments or tows are subsequently cut to the desired fiber length, or are stretch broken or cut-converted. Whereas the indiscriminately or randomly oriented cut fiber material must subsequently be separated and carded for renewed drawing and for reorienting the fibers in a parallel position, as well as for producing the fiber sliver, during stretch break-conversion the high uniformity of the tows is retained, and the excellent parallel orientation of the fibers in the slivers is also retained.

The fiber slivers produced from the fiber tows in stretch break-conversion or cut-conversion machines must have a sufficient cohesion so that these slivers can be transported and further processed. This cohesion is often provided by strand structure, fiber crimping, finishing, etc. In certain cases, additional measures are taken, for instance sliver condension, fiber crimping, application of finishing agent, production of a false twist, etc., in order to improve the cohesion of the fiber slivers. Even these measures do not always suffice to assure the required cohesion of the fiber slivers due to the characater of the raw material and/or due to the technology being utilized.

Thus, with the stretch break-conversion of certain raw material, the further processing of the fiber slivers, which are deposited in cans, causes difficulties. Due to insufficient sliver cohesion, the fiber slivers cannot be reliably withdrawn from the can. If the fiber sliver separates lengthwise, the two sliver portions experience different tensions as they are withdrawn from the can. The sliver that remains in the can is suddenly completely withdrawn after a certain period of time. Appropriate monitoring devices become operative and lead to stop of production. Moreover, expensive scrapping of the defective sliver results.

In a similar fashion, via the cut-conversion process, fiber bundles are produced that after being combined to form a fiber sliver do not assure sufficient sliver cohesion. This drawback can be eliminated only after passing through draw frames several times. At high production speeds, the depositing of the fiber sliver in particular causes difficulties, with expensive and complicated sliver-guidance elements having been developed to eliminate this problem.

Finally, with cotton combing machines, the high degree of parallelism of the fibers reduces fiber cohesion in the fiber sliver as a result of the cotton combing process. This can result in shutdown of production when the slivers pass through subsequent draw frames.

With this in mind, an object of the present invention is to develop a procedure for entwining the fibers of fiber slivers where the cohesion of the slivers is improved and where it is possible to transport and further process the fiber slivers without difficulty without limiting the range of application of previously conventional and advantageous processes. Also, an object of the present invention is to provide an apparatus for carrying out this procedure.

BRIEF DESCRIPTION OF THE DRAWINGS

These objects, and other objects and advantages of the present invention, will appear more clearly from the following specification in conjunction with the accompanying schematic drawings, in which:

FIG. 1 is a partially sectioned top view of one exemplary embodiment of an inventive apparatus for entwining fiber slivers;

FIG. 2 is a cross-sectional view taken along the line II—II in FIG. 1 through the concave crosssectional shape of the sliver;

FIG. 3 is a partially sectioned side view of the apparatus of FIG. 1;

FIG. 4 is a longitudinal cross-sectional view through the sliver funnel;

FIG. 5 is a front view of the sliver funnel;

FIG. 6 is a side view of a support system for the inventive apparatus; and

FIG. 7 is a top view of the support system of FIG. 6.

SUMMARY OF THE INVENTION

The present invention is characterized by converting the fiber sliver into a sliver having an essentially flat shape, deflecting a portion of the fibers or fiber groups of the sliver from their parallel orientation, and finally further deflecting the thus deflected fibers in a direction that is essentially perpendicular thereto, with this further deflecting step effecting entwining of deflected ones of the fibers with fibers that are still disposed in the parallel orientation.

Thus, to entwine the fibers of the fiber slivers, a multistage, i.e. three-stage, procedure is proposed that can be easily integrated into existing procedures. First of all, the fiber sliver is converted into a configuration that is suitable for the entwining process, namely a flat sliver shape. In the second step, the fibers or fiber groups are deflected from their parallel orientation, with this second step being a prerequisite for the following entwining in the third step. In this third step, the already deflected fibers are again deflected, this time perpendicular to the direction of deflection in the second step. This results in an entwining of the twice deflected fibers with the parallel fibers. As a result of this entwining, the cohesion of the fiber slivers is considerably improved, whereby the fiber slivers that are produced on the one hand permit withdrawal from the deposit can with no difficulty, yet on the other hand the desired structure of the fiber sliver is affected only temporarily, so that after passing through the conventional draw stages, no undesired adverse effect upon the quality of the product can be noted.

Pursuant to one preferred way of carrying out the inventive method, the fiber sliver is converted into a flat sliver shape having a concave crosssectional shape, with the end regions having a greater cross-sectional area. This concave crosssectional shape is the optimum configuration for the entwining process with a high degree of effectiveness. Pursuant to a further feature of the present invention, to achieve the concave cross-sectional shape of the sliver, the latter is appropriately guided along the bottom and sides. In so doing, the concave shape can be achieved in a technically straightforward manner.

Preferably, the fibers along the edges of the fiber sliver are deflected and entwined with the parallel fibers. This produces an adequate cohesion of the entire fiber sliver. With the concave cross-sectional shape of the sliver, deflection is preferably effected among the fibers along those edges of the sliver having a larger cross-sectional area in conformity to the concave shape.

It is proposed pursuant to a further preferred way of carrying out the inventive procedure that the fibers be deflected to the side in a transverse plane of the fiber sliver, and that to entwine the deflected fibers with the parallel fibers, the deflected fibers be deflected again, this time perpendicular to the transverse plane of the sliver. By deflecting the fibers first in the transverse plane of the fiber sliver, and subsequently perpendicular thereto, an optimum entwining of the fibers with one another is achieved, so that in this manner a very good sliver cohesion is achieved.

The deflection of the fibers of the fiber sliver is preferably effected by flowing air jets against them. The entwining is thus carried out in a practical manner by an aerodynamic swirling. Pursuant to a further feature of the invention, the air pressure is in a range between 0.5 bar and 8 bar, preferably in a range between 1 bar and 4 bar.

Finally, it is proposed pursuant to the inventive method to enrich the air jets with finishing and/or marking agents. The advantage of doing so is that the fiber slivers supplied from stretch break-conversion machines, trim-conversion machines, carding operations, drawing operations, etc. are frequently supplied with finishing agents and/or marking dyes. The task of finishing agents is to facilitate the further processing. For example, higher operating speeds are achieved, processing shutdowns are avoided, or improvements in the quality of the end product are achieved. Marking dyes facilitate identification of specific manufacture batches during subsequent processing. Up to now, finishing and marking required the use of additional application elements. Application by way of nozzles is particularly unsatisfactory, since on the one hand not all of the fibers in the interior of the sliver can be reached, and on the other hand a considerable portion of the chemicals escape into the atmosphere. The undesired escape of such chemicals leads, for example, to the rapid destruction of acrylic glass covers. The inventively proposed enrichment of the air jets with the brightening and/or marking agents permits integration of the up to now customary application elements, such as spray nozzles, into the treatment system for the fiber slivers. Application of these additional agents during the entwining process of the fibers of the fiber slivers offers the advantage that other machine parts, as well as the atmosphere that is accessible to the operators of the machine, are effectively protected from the escape of finishing and/or marking chemicals. Thus, the present invention further improves the cohesion of the fiber slivers, and also makes it possible to transport and further process the slivers without difficulty.

The inventive apparatus for carrying out the aforementioned procedure comprises a guide unit for receiving the fiber sliver and converting it into a sliver having an essentially flat shape, and a sliver funnel disposed downstream of the guide unit for receiving the fiber sliver therefrom, the sliver funnel having a cross-sectional shape that tapers in the direction of travel of the fiber sliver therethrough; disposed one after the other in the sliver funnel in the direction of travel of the fiber sliver therethrough are at least two pairs of nozzle means, with these pairs of nozzle means being disposed in a crosswise manner relative to one another, and with each pair of nozzle means including at least two nozzles, one on each side of the fiber sliver directed at the latter and in opposite directions relative to one another; each nozzle is adapted to receive compressed air. Each pair of nozzle means can include several nozzles.

As a consequence of the guide unit ahead of the sliver funnel, and of the pairs of nozzle means disposed in the funnel, it is possible in a technically straightforward manner to achieve entwining of the fibers of the fiber slivers, with it merely being necessary to replace the heretofore known sliver funnels with sliver funnels that on the outside look similar, but contain appropriate air nozzles. As a result of the crosswise arrangement of the pairs of nozzle means, it is possible to achieve deflection of the fibers of the fiber slivers in different directions. In this connection, it is the task of the guide unit to convert the fiber sliver into a flat shape.

The guide unit preferably comprises one horizontal guide bar on which the fiber sliver rests, and two lateral, vertical guide bars. These guide bars are preferably adjustable to permit alteration of the cross-sectional shape of the sliver. Since the fiber sliver rests upon the horizontal guide bar, it is automatically converted into the flat sliver shape as a result of its own weight. The lateral, vertical guide bars make it possible to convert the flat shape of the sliver into a concave cross-sectional shape. Due to the adjustability of the guide bars, the crosssectional shape can be varied as desired and can conform to requirements at any given time.

Pursuant to one preferred embodiment of the present invention, it is proposed that the first pair of nozzle means be disposed at the beginning of the sliver funnel in such a way that the direction of the air jets is in the transverse plane of the fiber sliver, while the second pair of nozzle means is disposed downstream thereof and has an air jet direction that is perpendicular to the transverse plane of the fiber sliver. As a result of this arrangement of the two pairs of nozzle means, the steps of the inventive procedure can be carried out very easily. In particular, the first pair of nozzle means effects deflection of the fibers, and the second pair of nozzle means effects the final entwining of the already deflected fibers.

The nozzles of a respective pair of nozzle means are preferably slightly offset relative to one another in order in this manner not to compensate for or counteract the effect of the oppositely directed air jets.

The compressed air is advantageously supplied to the respective nozzles via annular channels. However, the air can be supplied to the nozzles in any other convenient manner.

To allow the supplied air to exit, air-outlet bores can be disposed in the sliver funnel downstream of the pairs of nozzle means. This prevents air from possibly backing up in the sliver funnel. The diameter of the air-outlet bores is preferably in a range between 3 mm and 15 mm.

The diameter of the bores of the nozzles of the pairs of nozzle means is between 0.5 and 4 mm, with a bore diameter in a range of between 1 mm and 2 mm being preferred.

It is finally proposed pursuant to the present invention that the compressed air be enriched with finishing and/or marking agents. By enriching the compressed air with such agents, the cohesion of the fiber slivers is further improved for the further processing. By using a sliver funnel, it is possible to integrate the previously customary application elements, such as spray nozzles, into the system provided for treating the fibers. Providing this application within the sliver funnel offers the advantage that other machine parts, as well as the atmosphere that is accessible to the machine operators, are effectively protected against the escape of finishing and/or marking chemicals.

Further specific features of the present invention will be describe in detail subsequently.

DESCRIPTION OF THE PREFERRED EMBODIMENTS

Referring now to the drawings in detail, FIGS. 1 and 3 illustrate the overall apparatus for interweaving or entwining slivers or fiber slivers 1. This apparatus includes a support system 2 via which the apparatus can be mounted on a stretch break-conversion machine, a cut-conversion machine, or the like. The support system 2 is shown more clearly in the enlarged views of FIGS. 6 and 7. The support system 2 comprises a mounting plate 3 to which is welded a spacer 4. Welded to this spacer 4 is a horizontal support plate 5 that is provided with two elongated slots 6. Welded in turn to the horizontal support plate 5 is a vertical support plate 7 that is also provided with an elongated slot 8, which extends in the vertical direction. Adjustably mounted in the two slots 6 of the horizontal support plate 5 are vertical guide bars 9, while a horizontal guide bar 10 is vertically displaceably mounted in the slot 8 of the vertical support plate 7. These three guide bars 9, 10 form a guide unit 11 for the fiber or strand 1, which rests upon the horizontal guide bar 10 and, laterally delimited, is guided between the two vertical guide bars 9.

Disposed after the guide unit 11 for the fiber strand 1, when viewed in the direction of travel A of the latter, is a sliver funnel 12 that has a cross-sectional area which tapers or narrows in the direction of transport. This sliver funnel 12 is encircled by an air-guidance sleeve 13, at the ends of which are provided sealing rings 14.

In the region of the greatest cross-sectional area of the sliver funnel 12, a respective nozzle 15 is provided on opposite sides of the fiber sliver 1. The two nozzles 15 are disposed in such a way that they are directed in opposite directions, and are furthermore directed into the interior of the funnel 12. Air is supplied to the nozzles 15 via an annular channel 16 in the air-guidance sleeve 13. Further nozzles 17 are provided in the central region of the sliver funnel 12 on the upper side and lower side thereof. These nozzles 17 are also directed in opposite directions. As can be seen in particular in FIG. 5, five nozzles 17 are disposed on the upper side of the funnel 12, and four nozzles 17 are disposed on the underside of the funnel, with the nozzles on the upper side being offset relative to those on the underside. Air is supplied to the nozzles 17 via an annular channel 18 in the air-guidance sleeve 13. The sliver funnel 12 is furthermore provided with air-outlet bores 19.

Connected to the downstream side of the sliver funnel 12 are hydraulically or spring-loaded delivery rollers 20.

The inventive apparatus just described as operates as follows:

The fiber sliver 1, which is to undergo the inventive entwining process, comprises fibers 21 that essentially extend parallel to one another. In this state, the sliver 1 is supplied to the guide unit 11 in the direction of travel A. In so doing, the sliver 1 is supported on the guide bar 10, so that the sliver 1 is guided in a defined horizontal plane. Do to its inherent weight, or to the tensioning force, the fiber sliver 1 assumes a flat shape. Following the horizontal guide bar 10 are the lateral, vertical guide bars 9, via which the fiber sliver 1 is transformed or converted into a sliver having a concave cross-sectional shape, as illustrated in FIG. 2. Since the guide bars 9, 10 can be moved in their elongated slots 6, 8, the cross-sectional shape of the sliver can be appropriately varied.

The fiber sliver 1 is subsequently guided through the sliver funnel 12. The fibers 21 of the sliver 1 first have air blown against them from the lateral nozzles 15, and are hence deflected in the horizontal direction. The air pressure can be in a range between 0.5 bar and 8 bar, preferably being in a range between 1 bar and 4 bar, so that the speed of the air jets is several times greater than the speed of the fiber sliver 1.

When the fibers 21 that have been deflected in the horizontal direction reach the nozzles 17, which inject air perpendicular to the nozzles 15, the fibers 21 are once again deflected, this time however in the vertical direction, thus leading to an entwining of deflected fibers 21 with parallel fibers 21. Since the central axes of the oppositely directed nozzles 17 are offset relative to one another, the effect of the oppositely directed air jets is not compensated for or counteracted, so that it is possible to achieve an optimum action on the fibers 21. The air that is supplied via the nozzles 15 and 17 exits via the air-outlet bores 19.

Due to the way that the pair of nozzles 15 and the paired groups of nozzles 17 are arranged in a crosswise manner one after the other, the fibers that are deflected by the air jets are reliably interlaced and hence entwined in the fiber arrangement. After leaving the sliver funnel 12, the entwined fiber sliver 1 passes into the nip or clamping space between the hydraulically or spring-loaded take-up rollers 20. From there, the fiber sliver 1 can be further processed; for example, the sliver 1 can be deposited in a can.

The compressed air for entwining the fibers of the sliver 1 can advantageously be enriched with finishing and/or marking agent. The finishing agents facilitate, for example, further processing of the fiber slivers 1. For example, higher processing speeds are achieved, processing shutdowns are avoided, or improvements in the quality of the end product are achieved. During further processing, the marking dyes facilitate identification of specific manufacture batches. The air that is enriched with the finishing and/or marking agents is supplied via the annular channels 16, 18 and the nozzles 15, 17. Excess air again exits via the air-outlet bores 19, as well as hose lines or other conduits that are connected thereto and that can be under a partial vacuum, for example, as a result of being connected to a suction pump. Instead of simultaneously finishing, marking, and entwining the fibers or the sliver 1 in a single sliver funnel 12 with appropriately enriched air jets, it is also possible to provide a separate funnel 12 to which is supplied finishing and/or marking agent via appropriate annular channels 16, 18 and nozzles 15, 17.

The present invention is, of course, in no way restricted to the specific disclosure of the specification and drawings, but also encompasses any modifications within the scope of the appended claims.

What I claim is:

1. An apparatus for entwining the fibers of a sliver, with said sliver comprising individual fibers that are initially disposed essentially parallel to one another, said apparatus comprising:
- a guide unit for receiving said fiber sliver and converting it into a sliver that has an essentially flat shape; and
- a sliver funnel disposed downstream of said guide unit for receiving said fiber sliver therefrom, said sliver funnel having a cross-sectional shape that tapers in the direction of travel of said sliver therethrough; disposed one after the other in said funnel in said direction of travel are at least two pairs of nozzle means, with said pairs being disposed in a crosswise maner relative to one another, and with each pair of nozzle means including at least two nozzles, one on each of opposite sides of said fiber sliver directed at the latter and in opposite directions relative to one another; and means to supply compressed air to said nozzles.

2. An apparatus according to claim 1 in which at least one of said pairs of nozzle means comprises several nozzles.

3. An apparatus according to claim 1, in which said guide unit comprises a horizontal guide bar on which said fiber sliver is adapted to rest, and two lateral, vertical guide bars.

4. An apparatus according to claim 3, in which means are provided to permit adjustment of said guide bars to permit different cross-sectional shapes of said sliver to be obtained.

5. An apparatus according to claim 3, in which a sliver is received in said funnel, from said guide unit, in an essentially flat state that includes a transverse plane; in which said pairs of nozzle means includes a first pair of nozzle means having nozzles that are disposed near an upstream end of said funnel in such a way that air jets therefrom are dispoed in said transverse plane of said fiber sliver; and in which said pairs of nozzle means includes a second pair of nozzle means disposed downstream of said first pair of nozzle means and having nozzles that are disposed in such a way that air jets therefrom are disposed perpendicular to said transverse plane of said fiber sliver.

6. An apparatus according to claim 5 in which the nozzles of said second of nozzle means are slightly offset relative to one another.

7. An apparatus according to claim 6, in which said means to supply compressed air to said nozzles comprises annular channels on said sliver funnel that are connectible to a source of compressed air to supply the latter to said nozzles.

8. An apparatus according to claim 7, in which said sliver funnel, downstream of said pairs of nozzle means, is provided with air-outlet bores to allow air that is supplied to said nozzles to escape.

9. An apparatus according to claim 8 in which each of said air-outlet bores has a diameter of from 3 to 15 mm.

10. An apparatus according to claim 9, in which each of said nozzles has a bore with a diameter of from 0.5 to 4 mm.

11. An apparatus according to claim 10, in which said nozzles bore diameter is between 1 and 2 mm.

* * * * *